United States Patent [19]

Meyn

[11] Patent Number: 4,811,462
[45] Date of Patent: Mar. 14, 1989

[54] APPARATUS FOR PROCESSING FILLETED FLAT-FISH

[75] Inventor: Pieter Meyn, Oostzaan, Netherlands

[73] Assignee: Meyn Weighing Systems B.V., Ae Oostzaan, Netherlands

[21] Appl. No.: 102,548

[22] Filed: Sep. 29, 1987

[30] Foreign Application Priority Data

Dec. 19, 1986 [NL] Netherlands .................. 8603233

[51] Int. Cl.⁴ .................. A22C 25/14; A22C 25/17
[52] U.S. Cl. ............................................. 17/62; 17/55; 17/64; 17/46
[58] Field of Search .................. 17/55, 56, 61, 64, 46, 17/62

[56] References Cited

U.S. PATENT DOCUMENTS

| | | | |
|---|---|---|---|
| 1,179,101 | 4/1916 | Hendricks et al. | 17/55 |
| 2,565,727 | 8/1951 | Henderson | 17/61 X |
| 2,714,221 | 8/1955 | Gradoff et al. | 17/46 X |
| 4,630,334 | 12/1986 | Evers et al. | 17/56 |

FOREIGN PATENT DOCUMENTS 2227830 12/1973 Fed. Rep. of Germany .......... 17/64

Primary Examiner—Willie G. Abercrombie
Attorney, Agent, or Firm—Dority & Manning

[57] ABSTRACT

An apparatus for processing filleted flatfish comprises a conveyor means for the fillets and processing devices positioned beside the conveyor means. The processing devices preferably in the form of rotating brush means that move in a plane perpendicularly to the plane of transport of the fillets, remove the fat brims of the fillets.

22 Claims, 2 Drawing Sheets

APPARATUS FOR PROCESSING FILLETED FLAT-FISH

BACKGROUND OF THE INVENTION

The invention relates to an apparatus for processing filleted flatfish, having a conveyor means for moving the fillets in a flat position and processing devices positioned beside the conveyor means for removing the fat-brims of the fillets.

When flatfishes have the head and the entrails removed and the flatfishes are cut along their central longitudinal plane, two fillets are obtained. During further processing the fish-bones and, possibly, the skin are removed. The fillets obtained in this way have each at their two edges extending from head to tail narrow fat brims. These fat brims are so loosely connected to the remaining part of the fillets that they easily let loose, partially, and provide the fillets with an unattractive appearance. Therefore, in a known process these fat brims are manually removed. A disadvantage of this process is that it is labor intensive, and expensive, and the hygienic circumstances are not optimal. Moreover, manually removing said fat brims is an unpleasant job for it must be carried out in a cold and wet atmosphere.

SUMMARY OF THE INVENTION

It is an object of the invention to provide an apparatus for processing filleted flatfish, with which these disadvantages are overcome in a simple but nevertheless effective way.

Therefore, the apparatus according to the invention comprises a conveyor means for moving the fillets in a flat position and processing devices positioned beside the conveyor means for removing the fat brims of the fillets.

By means of apparatus constructed according to the invention, manually removing the fat brims becomes superfluous because this is now carried out fully automatically.

In a preferred embodiment of the apparatus according to the invention, the processing devices comprise rotating brush means. The rotating motion of these brush means is extremely effectively in removing the fat brims.

The function of the brush means may be improved further if, according to another embodiment of the invention, the track followed by each brush means lies in a plane perpendicular to the plane of transport of the fillets.

If the brush means are all positioned in pairs at both sides of the conveyor means, care is taken for symmetrically loading the fillets to be processed, so that their transport by the conveyor means will not be influenced.

In another embodiment of the apparatus according to the invention, each pair of brush means is positioned to move in a V-shaped path, the tip of the V being directed opposite to the direction of movement of the flatfish. With respect to this, it is further preferred that the circumferential velocity of the brush means at their point of contact with a fillet to be processed comprises a component equalling the transport velocity. In this way, the fat brims of the fillets are moved sideways, avoiding a mutual displacement of the fat brims and the fillets in the direction of fish movement. Such a displacement could lead to the fat brim breaking apart so that portions of said fat brim could remain on the fillet.

In a further embodiment of the apparatus, according to the invention, the processing devices further comprise loosening means located, as seen in the drawings, in the direction of transport, behind the brush means for fully separating the fillets from the fat brims already partially removed by the brush means. These loosening devices, comprise two endless belts located at both sides of the conveyor means, and extending around at least two reversing rolls. The velocity component of said belts in the direction of transport is different from the transport velocity and loosens the fat brims from the fillets. The loosened fat brims can be carried off.

In a further embodiment of the apparatus according to the invention the conveyor means comprises two cooperating conveyor belts, one of which lies at the same level as a support surface for the fillets to be processed, and the other is located at a short distance above the one conveyor belt. These two conveyor belts effectively enclose and move the fillets whereas the portions of the fillets extending beyond the edges of said conveyor belts slide along the support surface.

A spraying device is applied for spraying water onto the support surface, removing the loosened fat brims.

BRIEF DESCRIPTION OF THE DRAWINGS

Next the invention will be explained further with reference to the drawings, that illustrate an embodiment of the invention, wherein.

DETAILED DESCRIPTION OF THE DRAWINGS

Figure 1:
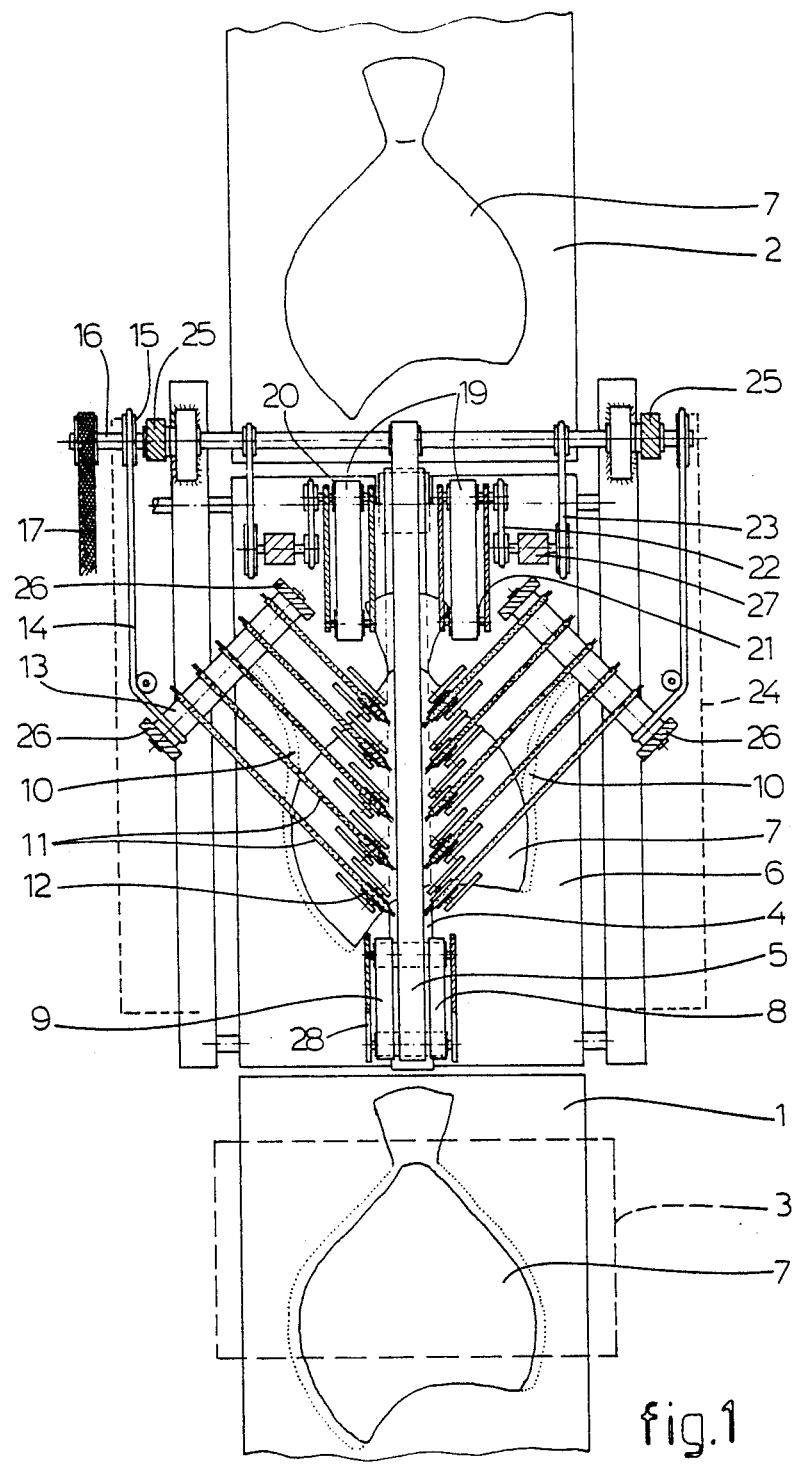
FIG. 1 shows, partially cut-away, a top view of an embodiment of apparatus constructed according to the invention in its working position.

The apparatus shown in FIG. 1 is positioned in a processing station between a supply unit 1, such as a belt conveyor, and a discharge unit 2, that can also comprise a belt conveyor. At the supply unit 1, as indicated in dotted lines a skinning device 3 can be provided. Although, according to the embodiment shown in FIG. 1, the skinning device 3 is positioned at the supply unit 1, it is also possible for this skinning device to be part of the apparatus enclosed by the supply unit 1 and the discharge unit 2.

The apparatus comprises a conveyor means for moving the fillets in a flat position. This conveyor means exists of two cooperating conveyor belts 4, 5. One conveyor belt 4 lies substantially at the same level as a support surface 6, whereas the other conveyor belt 5 is located at a short distance above the conveyor belt 4. The facing sections of these conveyor belts 4, 5 move at the same velocity and in the same direction. In FIG. 1 the direction of motion is from bottom to top of the drawing. In this way, fillet 7, that is supplied tail first by the supply unit 1, is engaged between the conveyor belts 4 and 5 and, as seen in FIG. 1, transported from bottom to top. The conveyor belts 4 and 5 are provided with a rough surface for transporting the fillets without the risk of any damages.

As appears clearly from FIG. 1, the width of the lower conveyor belt 4, on which the fillet is supported, is substantially less than the width of the fillet 7. In order to ensure that the sections of the fillet 7 extending beyond the conveyor belt 4 can slide easily along support surface 6, a spraying device (not shown), is provided for spraying water onto the support surface 6. As a result, the friction between the fillet 7 and the support surface 6 will be reduced substantially. Such a spraying device, however, can be advantageous also in simplifying the discharge of loosened fat brims, leading, as will appear later, to a special position of said spraying device.

For correctly supplying the fillets 7 to be processed to the apparatus, the apparatus comprises at the supply ends of the conveyor belts 4, 5 on both sides of the conveyor belt 5, two short auxiliary conveyor belts 8, 9. The velocity of the sections of these auxiliary conveyor belts 8 and 9, engaging the fillets, is equal to the velocity of the corresponding sections of the conveyor belts 4 and 5.

Alongside the conveyor belt 5, are positioned processing devices for removing the fat brims 10 of the fillets.

First, the processing devices comprise rotating brush means 11. Brush means 11 are positioned so that the track followed by each brush means 11 lies in a plane perpendicular to the plane of transport of the fillets 7, and perpendicular to the support surface 6. The brush means 11 are all positioned in pairs at both sides of the conveyor belt 5, where each pair of brush means 11 form a V-shaped path, and the tip of the V is directed towards the supply end of the apparatus. The position of the brush means 11 is such that they all include an angle of 45° with the conveyor belt 5.

Figure 2:
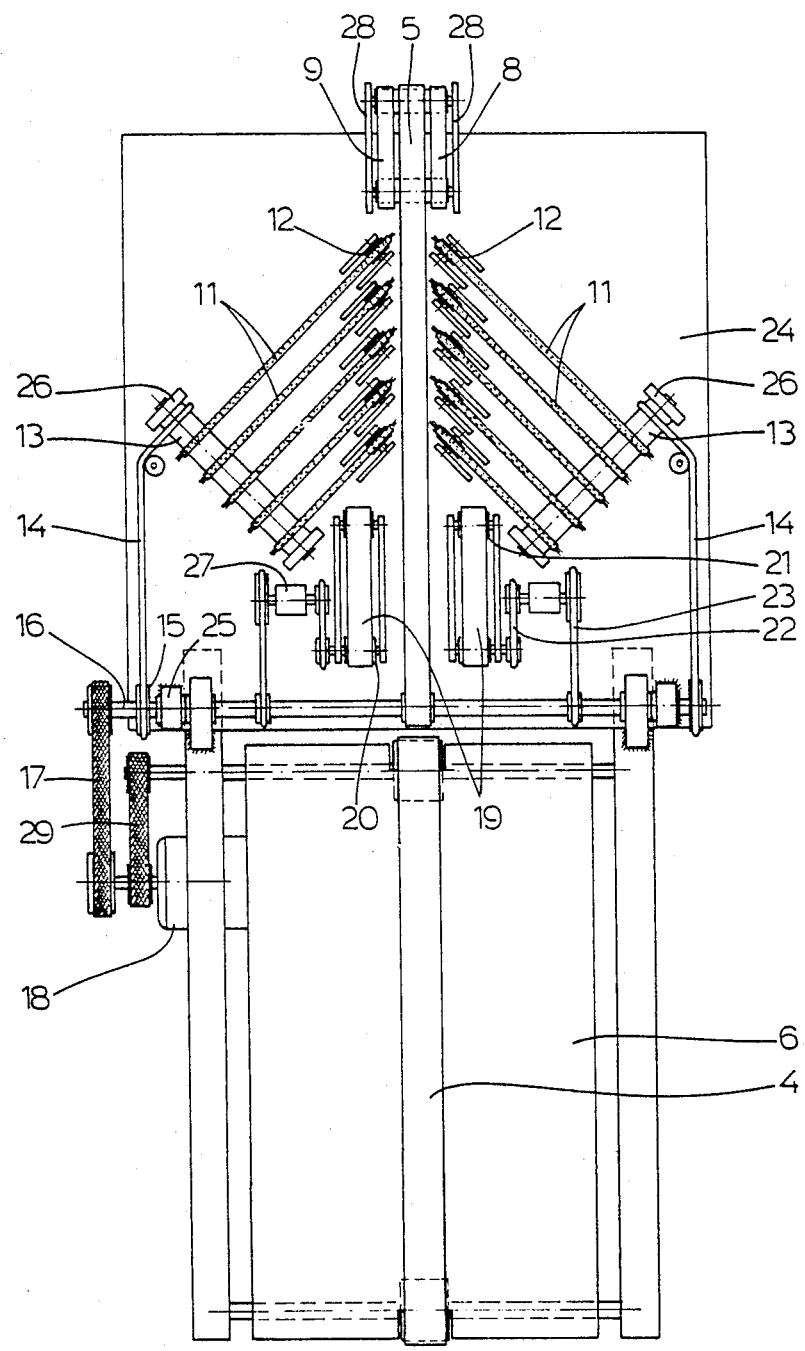
FIG. 2 shows the apparatus of FIG. 1 in an idle open position.

Each brush means 11 comprises an endless belt provided with brush bristles and extends around a first reversing roll 12 and a second reversing roll 13. Reversing roll 13 provides a common driving roll for all brush means 11 positioned at the same side of the conveyor belt 5. The reversing roll 13 is, by a belt 14, connected with a driving wheel 15 which is fixed to a shaft 16, which is connected by belt 17 to a motor 18 (FIG. 2). By the application of a driving or reversing roll 13, respectively, for all the brush means 11 positioned at the same side of the conveyor belt 5, it is guaranteed that these brush means 11, all have the same circumferential velocity.

For obtaining the optimal function of the brush means 11, their circumferential velocity at their point of contact with the fillets 7, equals the transport velocity thereof.

When a fish fillet 7 passes through the apparatus, the front, longer, brush means 11 will contact the fillet 7 first and partially loosen the fat brims 10. The velocity component of the brush means 11 in the direction of the transport velocity of the fillets equals the transport velocity, the fat brims 10 are subjected to a resulting transverse displacement, thus avoiding tearing the fat brims in small pieces. As the fillet moves along surface 6 the other, progressively shorter, brush means 11 contact the fat brims 10. FIG. 1 shows a position in which already a part of the fat brims of a fillet 7 has been loosened.

Due to the symmetrical position of the brush means 11, at both sides of the conveyor belt 5, symmetrical forces are exerted on the fillets, thus effectively avoiding displacing the fillets transversely relative to the conveyor belts 4 and 5.

Brush means 11 may have different brush bristle densities. As a result, an optimal adaption of the brush means 11 to the fillets 7 to be processed may be obtained.

Due to the shape of the brush means 11 extending around the reversing rolls 12, near the conveyor belt 5, the brush means 11 do not, or barely, engage the fat brim sections positioned near the conveyor belt 5. To assure that the fat brims 10 are entirely loosened from the fillets 7, the processing devices further comprise loosening means 19, located behind the brush means, fully removes the fillets from the fat brims already partially removed by the brush means 11.

Loosening means 19 comprise two endless belts located at both sides of the conveyor belt 5 and each extends around reversing rolls 20, 21. The reversing rolls 20 are driven by the shaft 16 by belts 22, 23. The gear ratio obtained by the belts 22, 23 is such that the velocity component of the loosening means 19 in the direction of transport of the fillets 7 differs from the transport velocity of the fillets. In this way the ends of the fat brims 10, not entirely separated from the fillets 7 by the brush means 11, can be effectively separated from the fillets 7.

Contrary to the embodiment illustrated in FIG. 1, it is generally advantageous if the loosening means 19 are located at a distance alongside the conveyor belt 5 so that they only engage the fat brims 10 of the fillets 7 that are already partially removed by the brush means. An adaption to the different sizes of fillets is possible if the loosening means 19 are (in a way not shown in detail) adjustable in width.

In another embodiment the loosening means 19, all have a rough surface, just like the brush means 11, and are positioned in a V-shaped path, the tip of the V being directed towards the supply side of the apparatus.

Referring to the spraying device, as mentioned before, it is noted that it (as seen in the direction of transport) is positioned behind the brush means 11. In this way the spraying device has a special function in totally removing the fat brims 10 by the loosening means 19.

Further, in FIG. 1 (in dotted lines) a frame plat 24 has been illustrated schematically, said plate being pivotably connected with the support surface 6, and to which plate the conveyor belt 5 and the processing devices are mounted.

As appears from FIG. 2 the frame plate 24 is, by means of jibs 25, pivotably mounted on the shaft 16. In this way frame plate 24 can be pivoted relative to the support surface 6, without the need for uncoupling the belt 17. The reversing rolls 13 are connected to frame plate 24 by means of supports 26, whereas bearing blocks 27 form part of the connection between the loosening means 19 and frame plate 24. Finally, support plates 28 form the connection between the frame plate and the ends of the conveyor belt 5 and the auxiliary conveyor belts 8, 9 positioned at the supply side.

In the fold-out or opened position of the apparatus, as shown in FIG. 2, all the processing devices and the conveyor belts are well accessible, so that cleaning the apparatus can be carried out easily. Further maintenance can be taken care of while the apparatus is open.

Further, it can be seen in FIG. 2 that the motor 18 provides for the drive of the lower conveyor belt 4 through a drive belt 29. As appears from the foregoing, all parts of the apparatus are driven by motor 18, thus simplifying the synchronization of these parts.

The invention is not limited to the embodiment described herein before, but can be varied widely within the scope of the invention.

I claim:

1. Apparatus for removing fat brims from fillets of flatfish, comprising:

(a) flat conveyor means for conveying said fillets along a first planar path, said conveyor means having a width which is less than the width of said fillets; and (b) rotary brush means disposed alongside said conveyor means, moving in a path transverse to said first path, for engaging said fat brims and for removing said fat brims from said fillets.

2. Apparatus as set forth in claim 1, wherein the path of said rotary brush means lies in a plane which is perpendicular to the plane of said first path.

3. Apparatus as set forth in claim 1, wherein said rotary brush means are disposed in pairs along both sides of said conveyor means.

4. Apparatus as set forth in claim 3, wherein each pair of said brush means is positioned in a V-shaped path, the tip of the V being directed opposite to the direction said conveyor means conveys said fillets.

5. Apparatus as set forth in claim 4, wherein the path of each of said brush means extends at an angle of 45° to said first path.

6. Apparatus as set forth in claim 4, wherein the circumferential velocity of the brush means at its point of contact with said fat brims equals the velocity of said conveyor means.

7. Apparatus as set forth in claim 2, wherein said rotary brush means comprises a plurality of endless belts with bristles guided about two reversing rolls.

8. Apparatus as set forth in claim 2, wherein said brush means comprise a plurality of rotary brushes having varied bristle density.

9. Apparatus as set forth in claim 2, wherein said apparatus further comprises rotary separating means for fully separating partially removed fat brims from said fillets after they have passed said rotary brush means.

10. Apparatus as set forth in claim 9, wherein said separating means comprises two endless belts located alongside said conveyor means and extending around at least two reversing rolls, having a velocity component in the direction said fillets are conveyed which is different from the velocity of said conveyor.

11. Apparatus as set forth in claim 10, wherein the velocity of said separating means exceeds the velocity of said conveyor.

12. Apparatus as set forth in claim 10, wherein the belts of said separating means are positioned in a V-shaped path with the tip of the V directed opposite to the direction said fillets are conveyed.

13. Apparatus as set forth in claim 9, wherein said separating means are positioned at a distance from said conveyor means so that they engage only partially removed fat brims.

14. Apparatus as set forth in claim 13, wherein the spacing of said separating means is adjustable to accommodate various widths of fillets.

15. Apparatus as set forth in claim 9, wherein the belts of said separating means have a roughened surface.

16. Apparatus as set forth in claim 2, wherein said conveyor means comprises two cooperating conveyor belts, one of which is disposed at the same level as a support surface for said fillets, and the other of which is located at a level above said one conveyor belt.

17. Apparatus as set forth in claim 16, wherein each of said conveyor belts is provided with a roughened surface.

18. Apparatus as set forth in claim 2, which includes means for spraying water onto said support surface.

19. Apparatus as set forth in claim 18, wherein said water spraying device is disposed to spray water on said support surface after said fillets pass said rotary brush means.

20. Apparatus as set forth in claim 7, wherein said upper conveyor belt and said rotary brush means are supported so that they may be pivoted away from said support surface.

21. Apparatus as set forth in claim 20, wherein said upper conveyor belt and said rotary brush means are mounted on a frame plate which is pivotably connected to said support surface.

22. Apparatus as set forth in claim 2, wherein said apparatus is provided with a skinning device for skinning said fillets before they are contacted by said rotary brush means.

* * * * *